United States Patent [19]

Kimura et al.

[11] Patent Number: 5,316,112
[45] Date of Patent: May 31, 1994

[54] RESTRICTED PASSAGE SYSTEM IN VIBRATION DAMPING DEVICE

[75] Inventors: Takeshi Kimura, Kodaira City; Satoru Kawamata, Higashimurayama, both of Japan

[73] Assignee: Bridgestone Corporation, Tokyo, Japan

[21] Appl. No.: 871,089

[22] Filed: Apr. 20, 1992

[30] Foreign Application Priority Data

Apr. 20, 1991 [JP] Japan .................................. 3-115230

[51] Int. Cl.⁵ .............................................. F16F 15/18
[52] U.S. Cl. ....................................... 188/267; 188/320; 267/140.14
[58] Field of Search ...................... 267/140.14, 140.15; 188/267, 320

[56] References Cited

U.S. PATENT DOCUMENTS

| | | | |
|---|---|---|---|
| 4,720,087 | 1/1988 | Duclos et al. | 267/140.14 |
| 4,742,998 | 5/1988 | Schubert | 262/136 |
| 4,790,522 | 12/1988 | Drutchas | 267/225 |
| 4,861,006 | 8/1989 | Takano et al. | 267/140.14 |
| 4,893,800 | 1/1990 | Tabata | 267/140.15 |
| 4,973,031 | 11/1990 | Takano et al. | 267/140.14 |
| 5,148,897 | 9/1992 | Vanroye | 188/320 |

FOREIGN PATENT DOCUMENTS

| | | |
|---|---|---|
| 3433797 | 3/1986 | Fed. Rep. of Germany . |
| 3731024 | 3/1988 | Fed. Rep. of Germany . |
| 933852 | 11/1951 | France ................. 188/320 |
| 62-151449 | 9/1987 | Japan . |
| 63-72993 | 4/1988 | Japan . |
| 1135938 | 5/1989 | Japan . |
| 1153832 | 6/1989 | Japan . |
| 1115033 | 8/1989 | Japan . |
| 2138531 | 5/1990 | Japan . |
| 2176230 | 7/1990 | Japan . |

Primary Examiner—Matthew C. Graham
Attorney, Agent, or Firm—Sughrue, Mion, Zinn, Macpeak & Seas

[57] ABSTRACT

A restricted passage system is used in a vibration damping device, and comprises at least three cylindrical members concentrically arranged from each other at an interval and alternately serving as positive and negative electrodes and having a hole per each member in a position opposite to each other in diameter direction and insulation members fixed to upper and lower end portions of these members.

10 Claims, 6 Drawing Sheets

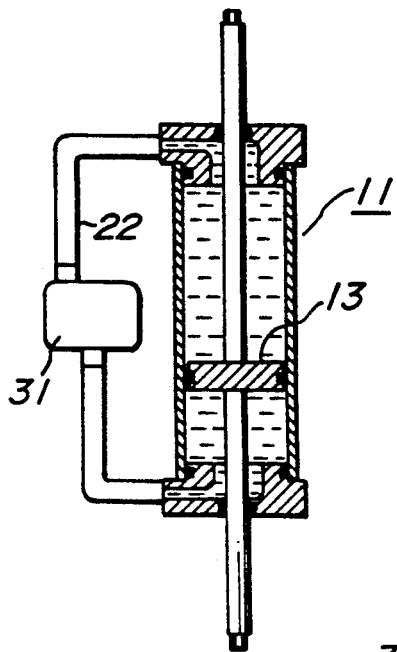
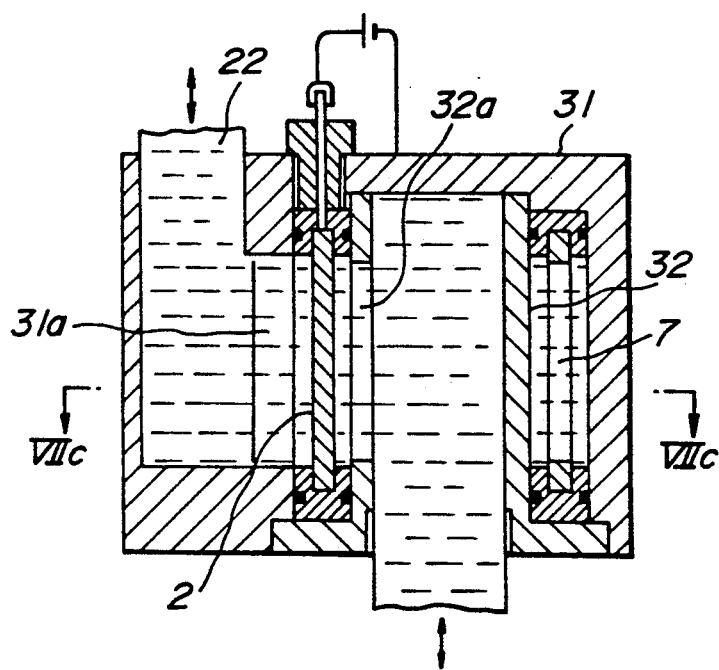
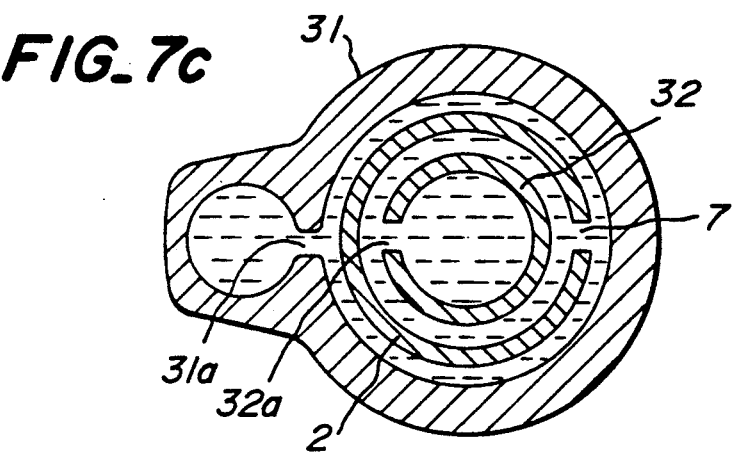

RESTRICTED PASSAGE SYSTEM IN VIBRATION DAMPING DEVICE

BACKGROUND OF THE INVENTION

1. Field of the Invention

This invention relates to a restricted passage system usable for use in a vibration damping device enclosing an electrorheological fluid therein, and more particularly to a restricted passage system capable of having a sufficiently long passage length for ensuring a large damping force.

2. Description of the Related Art

For example, Japanese Patent laid open No. 1-135938 and No. 2-176230 disclose a vibration damping device enclosing an electrorheological fluid therein, in which a viscosity of the electrorheological fluid passing through electrodes in a restricted passage system can be increased in accordance with a voltage between the electrodes or an intensity of electric field to change a damping force.

In the device described in Japanese Patent laid open No. 1-135938, the restricted passage is a zigzag passage extending outward and inward in the radial direction, so that the full length of the passage and hence the length of the electrode can not be prolonged to a satisfactory length and consequently the given damping force can not be obtained. Furthermore, the restricted passage is fastened at its one end to a side of a fastening member and at the other end to a portion of a movable member to change a sectional area of the passage in accordance with a relative displacement between the fastening member and the movable member, so that there is a problem that the occurrence of stable damping force can not always be obtained.

In the device of the Japanese Patent laid open No. 2-176230, a full length of the restricted passage formed between a piston and a damper casing is short, so that there is caused a problem of causing no large damping force.

SUMMARY OF THE INVENTION

It is, therefore, an object of the invention to advantageously solve the aforementioned drawbacks of the conventional technique and to provide a restricted passage system for a vibration damping device capable of producing a large damping force in accordance with use purpose by sufficiently lengthening the length of the restricted passage to sufficiently make the length of the electrode long.

According to the invention, there is the provision of a restricted passage system for a vibration damping device, comprising at least three cylindrical members each made from a conductive material and substantially concentrically arranged from each other at a given interval, which members alternately forming positive and negative electrodes; an insulation member fixed to each of upper end and lower end of these cylindrical members so as to liquid-tightly close a channel defined between the adjoining cylindrical members; and a hole formed in each of these members in opposite to each other in a diameter direction.

In the restricted passage system according to the invention, at least two inner and outer channels are formed among these cylindrical members so as to communicate with each other through holes formed in these members. That is, each of these channels extends from the hole formed in the inside cylindrical member to the hole formed in the outside cylindrical member in opposite to the former hole in the diameter direction, so that the total length of the channels can sufficiently be lengthened. Furthermore, the cylindrical member itself serves as an electrode, so that the length of the electrode can sufficiently lengthened. Therefore, the damping force can be increased to an expected value in connection with voltage applied to the electrode. This becomes conspicuous as the number of the cylindrical members increases.

Moreover, the channel formed between the adjoining cylindrical members is liquid-tightly closed by fixing the insulation member to each of the upper and lower ends of these cylindrical members, whereby the change of cross sectional area of the channel during the operation of the restricted passage system can surely be prevented.

As a result, when such a restricted passage system is applied, for example, to a vibration damping device, vibration energy can be absorbed very effectively by the large damping force and hence hence the stable vibration damping force can always be developed.

BRIEF DESCRIPTION OF THE DRAWINGS

The invention will be described with reference to the accompanying drawings, wherein:

FIGS. 3, 4, 5, 6, and 7(a), (b), (c) are longitudinally sectional views of various embodiments of the vibration damping device using the restricted passage system according to the invention.

DESCRIPTION OF THE PREFERRED EMBODIMENTS

Figure 1:
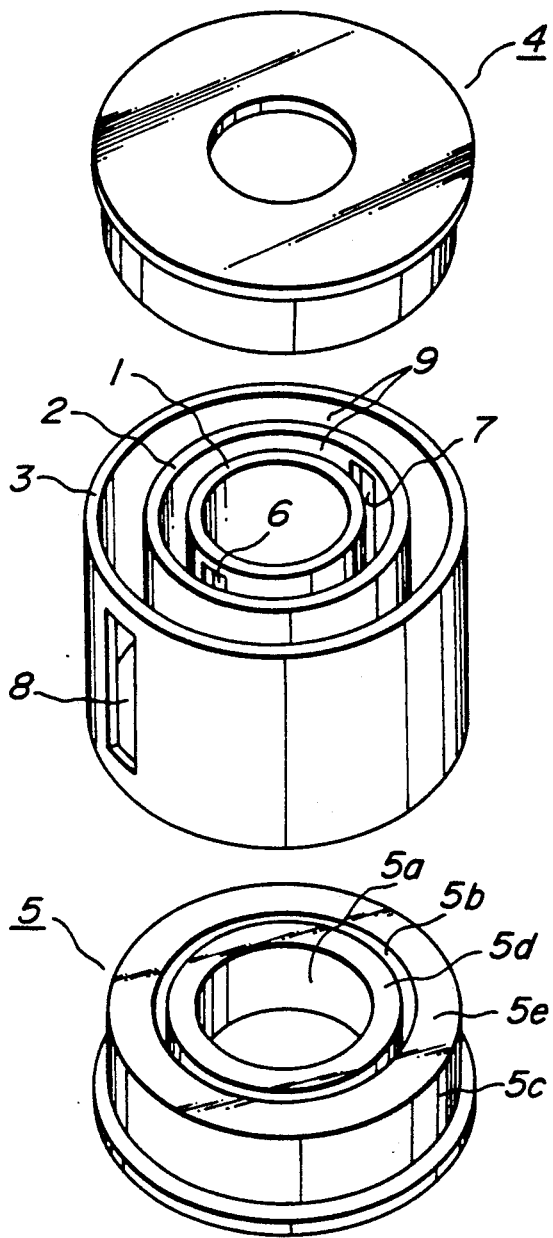
FIG. 1 is an exploded perspective view of an embodiment of the restricted passage system according to the invention.

FIG. 1 shows an exploded perspective view of the restricted passage system according to the invention, in which numerals 1, 2 and 3 are cylindrical members each made from a conductive material, respectively.

These innermost, intermediate and outermost cylindrical members 1, 2 and 3 contributing to define a channel are concentrically arranged at a given interval in this order. Among these members, the intermediate cylindrical member 2 serves as a positive electrode, and the innermost and outermost cylindrical members 1 and 3 serve as a negative electrode, respectively.

These cylindrical members 1, 2 and 3 are positioned to each other by liquid-tightly fitting and fixing a pair of closing members 4, 5 each made from an insulation material to each of upper end portions and lower end portions of these members 1, 2 and 3 and also the upper and lower ends of these members 1, 2 and 3 are liquid-tightly closed by these closing members 4 and 5.

As seen from the lower closing member 5, each of these closing members 4 and 5 comprises a wall surface 5a defining a through-hole and closely circumscribing with an outer peripheral surface of the innermost cylindrical member 1, an annular groove 5b permitting to fit the intermediate cylindrical member 2, and a vertical wall surface 5c closely inscribing with an inner peripheral surface of the outermost cylindrical member 3, and also inner and outer portions 5d and 5e adjacent to the annular groove 5b in each of the closing members 4, 5 serves as a plug fitting into a space between the adjoining cylindrical members, respectively.

Furthermore, each of opening holes 6, 7, 8 is formed in the respective cylindrical members 1, 2, 3 at a position in opposite to each other in a diameter direction. Preferably, each hole has an area approximately equal to a cross sectional area of a channel as mentioned later.

In the restricted passage system of the above structure, inner and outer channels 9 are defined between the adjoining cylindrical members so as to communicate with each other through the opening hole 7 formed in the intermediate cylindrical member 7 and are communicated to exterior through the opening holes 6, 8 for the supply and discharge of fluid.

Figure 2:
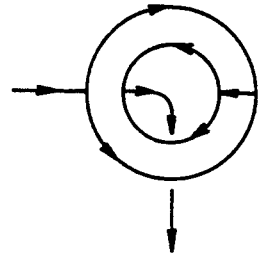
FIG. 2 is a schematic view illustrating a flow of an electrorheological fluid.

For example, when an electrorheological fluid is passed from the hole 8 through the channels 9 to the hole 6, as diagrammatically shown in FIG. 2, it flows from the hole 8 to the hole 7 located in opposite thereto in the diameter direction over about a half of peripheral length of the channel 9 and further flows from the hole 7 to the hole 6 located in opposite thereto in the diameter direction along the channel 9, so that the flowing distance of the electrorheological fluid and hence the total length of the channels 9 become considerably long as compared with the conventional case.

Thus, the length of the electrode becomes sufficiently long in the restricted passage system according to the invention, so that a very large damping force can be developed under an action of the electrorheological fluid flowing through the channels 9. Furthermore, the cylindrical members 1, 2 and 3 in the restricted passage system are relatively restrained by the closing members 4 and 5, so that the cross sectional area of the channels is maintained at a constant level over the whole of the restricted passage system and consequently the damping property produced by this restricted passage system can always be made constant to ensure the occurrence of stable damping force.

Figure 3:
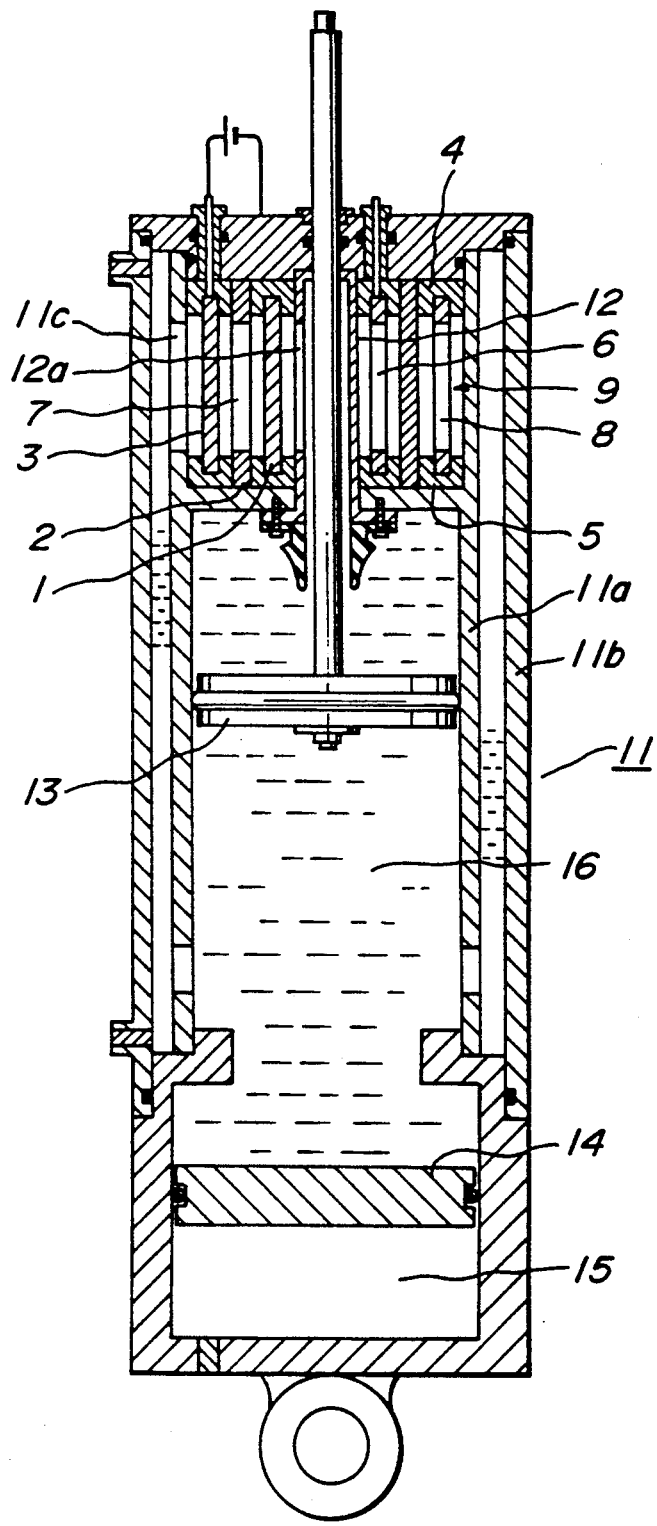

FIG. 3 is a first embodiment of the vibration damping device using the above restricted passage system. That is, the restricted passage system is applied to an upper end portion of a cylinder 11 comprising an inner sleeve 11a and an outer sleeve 11b separated from each other at a given interval.

In this embodiment, the innermost and outermost cylindrical members 1, 3 serve as a positive electrode, respectively and the intermediate cylindrical member 2 serves as a negative electrode, while the inner sleeve 11a arranged outside the outer periphery of the outermost cylindrical member 3 and an upper end closing sleeve 12 arranged inside the inner periphery of the innermost cylindrical member 1 serve as a negative electrode, respectively. Thus, the channel 9 has a substantially quartered structure having a very long total length. Further, the channel 9 is communicated from an opening hole 11a formed in the inner sleeve 11a through a gap defined between the inner sleeve and the outer sleeve to a chamber located beneath a piston 13 slidably contacting with the inner surface of the inner sleeve in the cylinder 11 and further through an opening hole 12a formed in the upper end closing sleeve 12 to a chamber located above the piston 13.

In this embodiment, the cylinder 11 is provided at its lower end portion with a closed gas chamber 15 defined by a free piston 14. Moreover, the closed gas chamber 15 may be communicated with atmosphere, if necessary.

In the illustrated vibration damping device, when an electrorheological fluid 16 is filled in this device, if the relative displacement between the cylinder 11 and the piston 13 is a direction of compressing the chamber located beneath the piston 13, the electrorheological fluid 16 existent in this chamber flows through the gap defined between the outer and inner sleeves constituting the cylinder 11 into the channel 9 while giving somewhat compressive deformation to the closed gas chamber and passes through the channels in the same manner as shown in FIG. 2 and then flows from the opening hole 12a of the upper end closing sleeve 12 through a gap defined between the sleeve 12 and a piston rod 13a into the chamber located above the piston 13. On the other hand, if the relative displacement between the cylinder 11 and the piston 13 is a direction of compressing the chamber located above the piston 13, the electrorheological fluid 16 flows existent in this chamber flows through the channels 9 into the chamber located beneath the piston 13 in a direction opposite to the former case.

In such a flowing of the electrorheological fluid 16, when voltage is not applied between the positive electrode and the negative electrode, the damping force of the restricted passage system is a relatively low value determined by viscosity inherent to the electrorheological fluid 16, cross sectional area and length of channel for the electrorheological fluid 16 and the like, so that when such a restricted passage system is applied to a vibration damping device, excellent vibration insulating performances against high frequency vibrations can be developed together with the expanded deformation of the closed gas chamber 15.

On the other hand, when voltage is applied between the positive and negative electrodes, the electrorheological fluid 16 is subjected to electric field over a full length of the channels 9 having a quartered structure and hence the viscosity is enhanced in accordance with the intensity of the electric field, whereby a very high damping force, for example, vibration damping force can be developed based on the flowing of high viscosity electrorheological fluid 16 through the channels 9.

Figure 4:
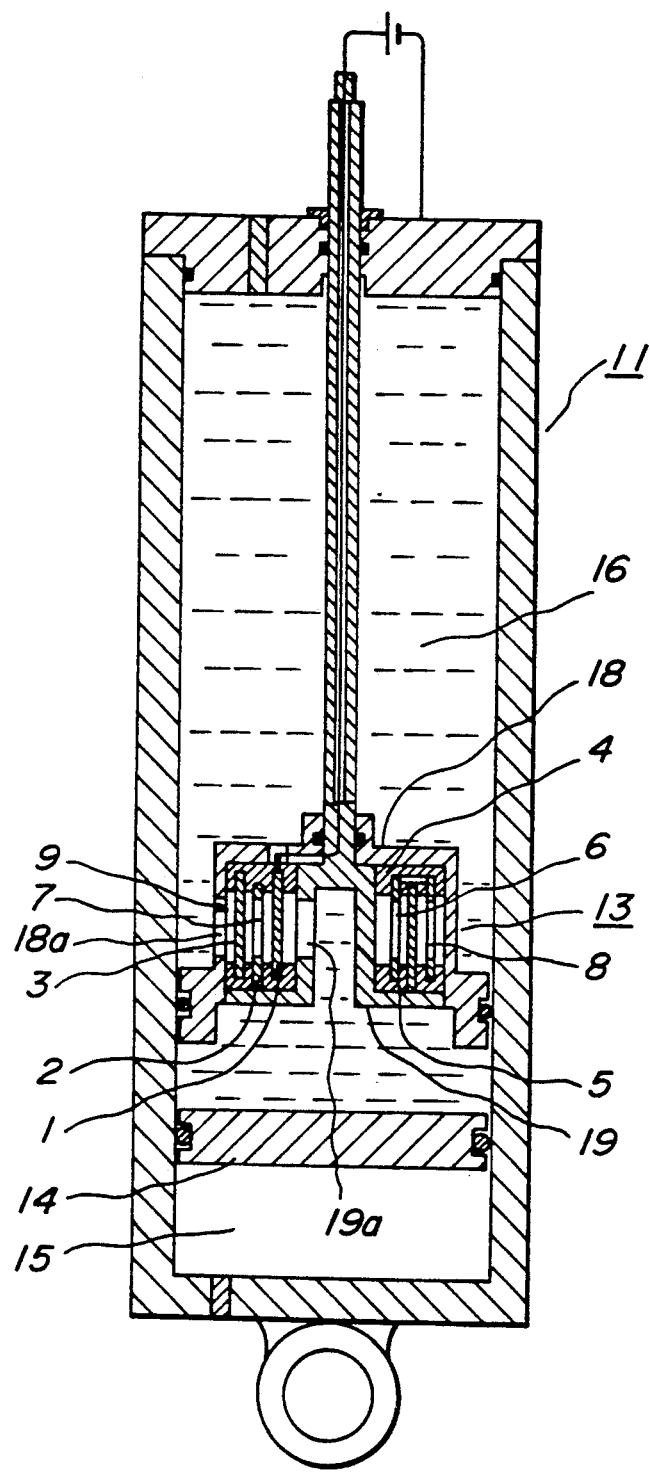

FIG. 4 shows a second embodiment of the vibration damping device in which the restricted passage system is applied to a piston slidably moving in a cylinder. In this case, the piston 13 comprises an innermost cylindrical member 1 and an outermost cylindrical member 3 serving as a positive electrode, an intermediate cylindrical member 2 serving as a negative electrode, an outer shell 18 enclosing the outermost cylindrical member 3 at a somewhat interval in the radial direction and slidably contacting with an inner wall surface of a cylinder 11, and an inner shell 19 located inward from the innermost cylindrical member 1 at a somewhat interval in the radial direction and integrally united with the outer shell 18. Moreover, the outer shell 18 and the inner shell 19 serve as a negative electrode, respectively. Thus, a long channel 9 having substantially a quartered structure is formed in the piston likewise the embodiment of FIG. 3 and is communicated to a rod-side chamber located above the piston 13 through an opening hole 18a formed in the outer shell 18 and to a head-side chamber located beneath the piston 13 through an opening hole 19a formed in the inner shell 19.

Even in the second embodiment of the vibration damping device, the electrorheological fluid 16 enclosed in the cylinder flows one chamber to the other chamber defined by the piston 13 through the long channel 9 in the relative displacement between the cylinder 11 and the piston 13, so that a very high damping force can be developed by applying a high voltage between the electrodes and enhancing the viscosity of the electrorheological fluid in accordance with the intensity of the electric field.

Figure 5:
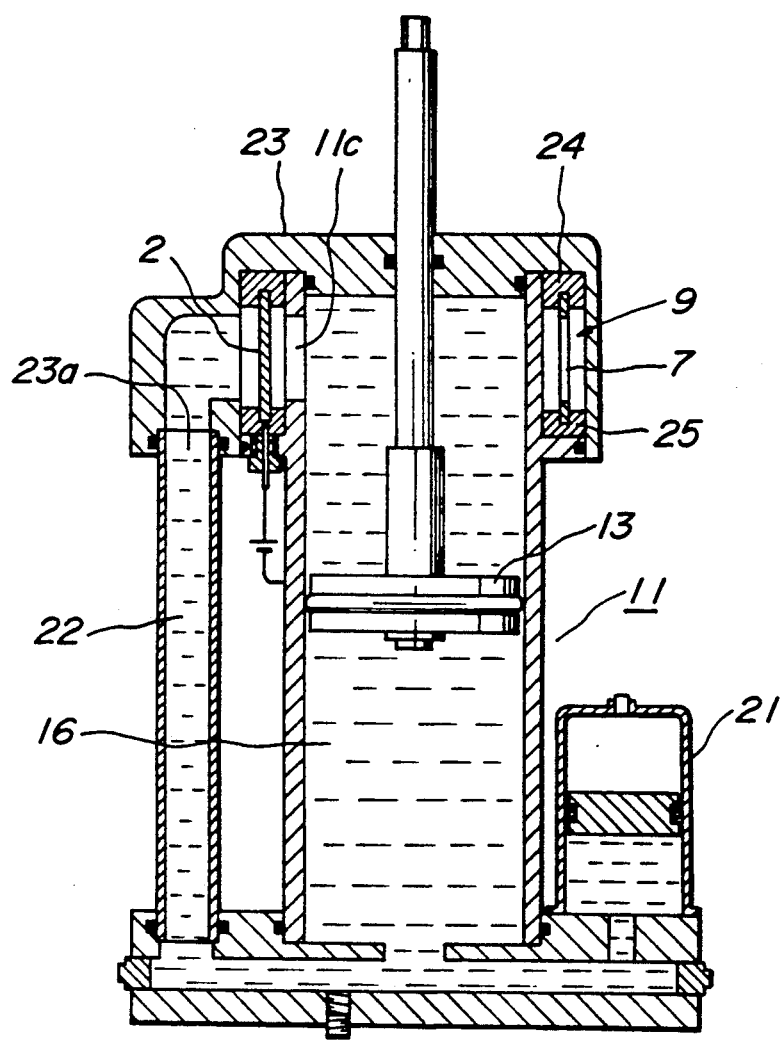

FIG. 5 shows a third embodiment of the vibration damping device in which the restricted passage system is applied to an outer peripheral side of the cylinder. In this case, an accumulator 21 is connected to a head-side chamber of the cylinder 11 circumscribing with the piston 13, while the head-side chamber is communicated with a rod-side chamber through an outer path 22. The restricted passage system is arranged in a portion of the outer path 22 opening to the rod-side chamber.

Such a restricted passage system comprises the cylinder 11 serving as an innermost cylindrical member, an intermediate cylindrical member 2 and a rod cover 23 serving as an outermost cylindrical member, which are positioned to each other and fixed by electric insulation members 24, 25. In this case, the cylindrical member 2 serves as a positive electrode, while the cylindrical and rod cover 23 serve as a negative electrode, respectively. Further, the opening holes 11c, 7 and 23a formed in these members are located in opposite to each other in the diameter direction, and also the opening hole 23a of the rod cover 23 is connected to the outer path 22, whereby the channel 9 can sufficiently be lengthened to have substantially a double structure and also the length of the electrode can sufficiently be lengthened. As a result, the desired damping force can be developed under an action of the electrorheological fluid 16 flowing through the channel 9 as shown in FIG. 2.

Figure 6:
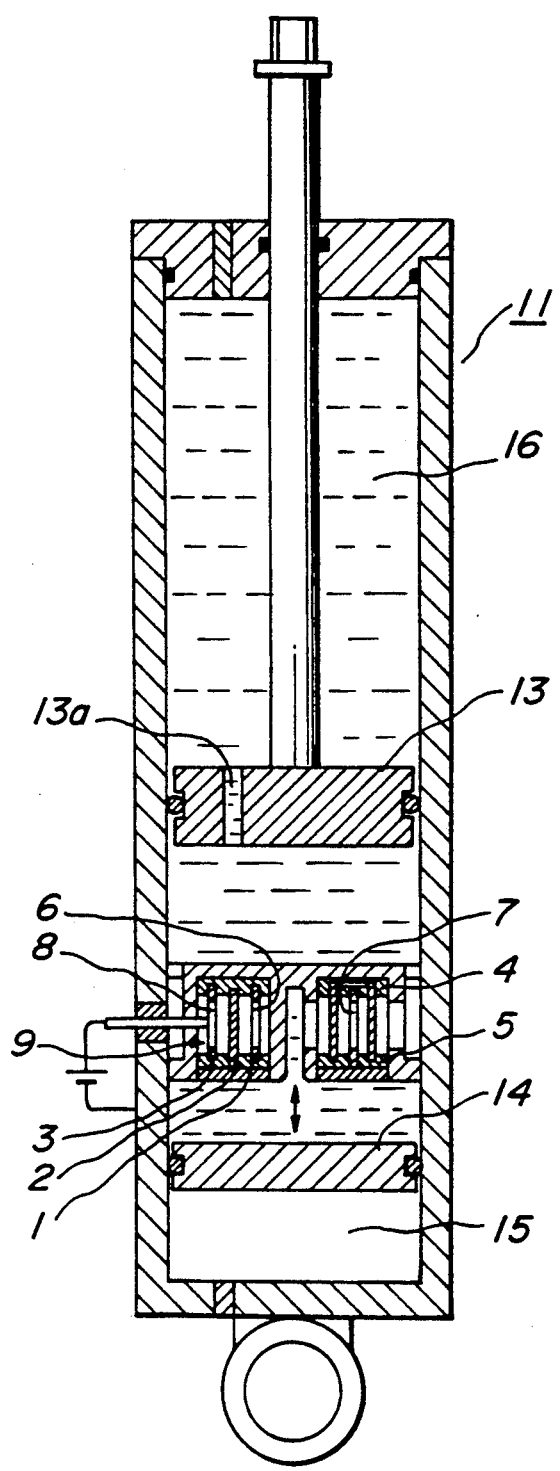

FIG. 6 shows a fourth embodiment of the vibration damping device in which the restricted passage system having substantially the same structure as in the piston of FIG. 4 is fixed to the inside of the head-side chamber in the cylinder 11 and the innermost and outermost cylindrical members 1, 3 serve as a positive electrode and the other members serve as a negative electrode.

According to this embodiment, when the piston 13 is slidably moved with respect to the cylinder 11, a part of the electrorheological fluid 16 flows between the head-side chamber and the rod-side chamber through a through-hole 13a formed in the piston 13, and the remaining portion of the electrorheological fluid 16 flows between the piston side and the free piston side through the long channel 9 having a substantially quartered structure. As a result, a sufficiently large damping force can be developed based on the action of such a restricted passage system.

FIG. 7a shows a fifth embodiment of the vibration damping device in which a restricted passage system as shown in FIG. 7b is arranged in the course of the outer path 22 communicating both chambers defined by the piston 13 in the cylinder 11 with each other. In this case, two piston rods are extended upward and downward from both surfaces of the piston 13. The restricted passage system comprises a housing 31 serving as an outermost cylindrical member, an intermediate cylindrical member 2 and a center cylinder 32 serving as an innermost cylindrical member, which are concentrically arranged at a given interval with each other. The intermediate cylindrical member serves as a positive electrode, and the other members serve as a negative electrode, respectively. As shown in FIG. 7c, opening holes 31a, 7 and 32a are formed in the housing 31, the intermediate cylindrical member 2 and the center cylinder 32 at positions opposite to each other in the diameter direction, respectively.

Even in this embodiment, a large damping force can be developed through the long channel 9 having a substantially double structure.

As mentioned above, in the restricted passage system according to the invention, the length of the channel and hence the length of the electrode defining the channel can sufficiently be lengthened and consequently the desired damping force can be developed.

Furthermore, when the restricted passage system is applied to the vibration damping device, the cross sectional area of the channel is unchanged over the full length of the channel irrespectively of relative displaced state between the cylinder and the piston, so that the damping property is always stable.

What is claimed is:

1. A restricted passage system for a vibration damping device, comprising at least three cylindrical members each made from a conductive material and substantially concentrically arranged from each other at a given interval, which members alternately forming positive and negative electrodes; a pair of insulation members fixed to upper end and lower ends of said cylindrical members, respectively, so as to liquid-tightly close a channel defined between adjoining cylindrical members; and wherein each of said cylindrical members has a hole, each of the holes being arranged along a common line which extends through said cylindrical members, wherein none of the holes directly opposes a hole of an adjacent cylindrical member, and wherein each of the holes has an opening approximately equal to a cross sectional area of said channel.

2. The restricted passage system according to claim 1, wherein said common line bisects said cylindrical members.

3. The restricted passage system according to claim 1, further comprising a main cylinder, and wherein said members are disposed at an upper end portion of said main cylinder.

4. The restricted passage system according to claim 3 further comprising a piston movably disposed in said main cylinder, and an accumulator connected to a head-side chamber of said main cylinder circumscribing with said piston.

5. The restricted passage system according to claim 1, further comprising a closed gas chamber defined by a lower end portion of said main cylinder and a free piston.

6. The restricted passage system according to claim 5 further comprising a movable piston disposed in said main cylinder.

7. The restricted passage system according to claim 1 further comprising a main cylinder, an outer shell for enclosing the outermost cylindrical member and being in slidable contact with an inner wall surface of said main cylinder.

8. The restricted passage system according to claim 1, wherein an outermost one of said members defines a housing, and further comprising a main cylinder coupled to said housing.

9. The restricted passage system according to claim 8 further comprising a piston movably disposed in said main cylinder.

10. The restricted passage system according to claim 9 further comprising a pair of piston rods which extend from opposite sides, respectively, of said piston.

* * * * *